United States Patent
Heitele et al.

(10) Patent No.: US 12,195,353 B2
(45) Date of Patent: Jan. 14, 2025

(54) WATER FILTER CARTRIDGE HAVING TANK LIMESCALE PROTECTION

(71) Applicant: AQUIS WASSER-LUFT-SYSTEME GMBH, LINDAU, ZWEIGNIEDERLASSUNG REBSTEIN, Rebstein (CH)

(72) Inventors: Bernd Heitele, Marbach (CH); Michael Weber, Rorschach (CH)

(73) Assignee: AQUIS Wasser-Luft-Systeme, GmbH, Lindau Zweigniederlassung Rebstein, Rebstein (CH)

( * ) Notice: Subject to any disclaimer, the term of this patent is extended or adjusted under 35 U.S.C. 154(b) by 198 days.

(21) Appl. No.: 16/968,519

(22) PCT Filed: Feb. 5, 2019

(86) PCT No.: PCT/EP2019/052685
§ 371 (c)(1),
(2) Date: Aug. 7, 2020

(87) PCT Pub. No.: WO2019/154767
PCT Pub. Date: Aug. 15, 2019

(65) Prior Publication Data
US 2021/0039962 A1    Feb. 11, 2021

(30) Foreign Application Priority Data

Feb. 9, 2018 (DE) .................... 10 2018 103 003.7

(51) Int. Cl.
| | |
|---|---|
| *C02F 1/42* | (2023.01) |
| *C02F 1/00* | (2023.01) |
| *C02F 1/68* | (2023.01) |
| *C02F 5/08* | (2023.01) |

(52) U.S. Cl.
CPC ................ *C02F 1/003* (2013.01); *C02F 1/42* (2013.01); *C02F 1/687* (2013.01); *C02F 5/086* (2013.01);
(Continued)

(58) Field of Classification Search
CPC .. C02F 1/003; C02F 1/42; C02F 1/687; C02F 5/086; C02F 2001/422; C02F 2201/006;
(Continued)

(56) References Cited

U.S. PATENT DOCUMENTS

| | | | | |
|---|---|---|---|---|
| 2,370,472 | A | * | 2/1945 | King ...................... C02F 5/086 71/36 |
| 2013/0334119 | A1 | * | 12/2013 | Trojan-Heitele ........ C02F 1/003 210/206 |

(Continued)

FOREIGN PATENT DOCUMENTS

| | | | |
|---|---|---|---|
| CN | 103476709 | A | 12/2013 |
| CN | 106630270 | * | 5/2017 |

(Continued)

*Primary Examiner* — Magali P Slawski
*Assistant Examiner* — Bernadette Karen McGann
(74) *Attorney, Agent, or Firm* — BRENEMAN & GEORGES (57) ABSTRACT

The invention relates to a water filter cartridge comprising a housing and a filter-side tank connection element for insertion into a water tank, more particularly into a water tank of a household appliance (11), and a filter section for treating the water to be taken from the water tank. It is distinguished by the fact that the water filter cartridge comprises a reservoir chamber with a means to counter precipitations in the water tank, where the reservoir chamber is designed separate from the filter section and its flow guideway for the water running through the filter section to be treated, in such a way that there is no contact between the water flowing through the filter section and the means to counter precipitations, and that the reservoir chamber has at least one passage for the (Continued)

means, whereby the means to counter precipitations is in contact with the unfiltered water in the water tank.

21 Claims, 3 Drawing Sheets

(52) U.S. Cl.
CPC .. *C02F 2001/422* (2013.01); *C02F 2201/006* (2013.01); *C02F 2307/10* (2013.01)

(58) Field of Classification Search
CPC .......... C02F 2307/10; C02F 5/14; C02F 5/00; B01D 35/30; B01D 27/00; A47J 31/44
See application file for complete search history.

(56) References Cited

U.S. PATENT DOCUMENTS

2014/0144829 A1  5/2014  Takeda et al.
2015/0053618 A1  2/2015  Johann

FOREIGN PATENT DOCUMENTS

| | | |
|---|---|---|
| CN | 106630270 A | 10/2017 |
| DE | 94 08 170 U1 | 10/1995 |
| DE | 696 25 343 T2 | 10/1996 |
| DE | 10 2010 022 954 A1 | 12/2010 |
| DE | 10 2012 003 528 A1 | 10/2012 |
| EP | 2 898 782 A1 | 7/2015 |
| EP | 02 898 782 A2 | 7/2015 |
| EP | 3382126 A1 * | 10/2018 ............. B01D 29/21 |
| JP | 2006-263718 | 10/2006 |
| JP | 2006-263718 A | 10/2006 |
| JP | 2014-512941 | 5/2014 |
| KR | 10-2014-0048858 A | 4/2014 |
| RU | 22662 U1 | 4/2002 |
| RU | 2568714 C2 | 4/2015 |

* cited by examiner

WATER FILTER CARTRIDGE HAVING TANK LIMESCALE PROTECTION

CROSS REFERENCE TO RELATED APPLICATION

The subject matter of this application is related to U.S. application Ser. No. 16/968,529 filed on Aug. 7, 2020, now abandoned, and titled WATER HARDNESS STABILIZATION WITH ANION EXCHANGER.

The invention relates to a water filter cartridge with a means to counter precipitations in a water tank, by having a water filter cartridge with a housing and a filter-side tank connection element for insertion into a water tank, more particularly into a water tank of a household appliance, and a filter section for treating the water to be taken from the water tank, characterized in that the water filter cartridge comprises a reservoir chamber with a means to counter precipitations in the water tank, where the reservoir chamber is designed separate from the filter section and its flow guideway for the water running through the filter section to be treated, in such a way that there is no contact between the water flowing through the filter section and the means to counter precipitations, and in that the reservoir chamber has at least one passage for the means, whereby the means to counter precipitations is in contact with the unfiltered water in the water tank and also to a method for use which includes utilizing a water filter cartridge having a weakly basic anion exchanger material, preferably with polyphosphate ions as counterions, as stabilizing agent.

For protection from limescale deposits in water transport and/or water treatment devices, such as lines and appliances, for example, water filters are commonplace in the trade, especially filter cartridges for hot-beverage makers that are supplied with water via a water tank, to protect the parts of the machine that transport hot water.

An unresolved problem in this case, however, is the accumulation of limescale in the water tank itself. Over time, then, in the case of hard water, lime precipitates in the water tank, forming lime edges on the inner surfaces of the water tanks.

These lime edges are unattractive and are undesirable in particular in appliances where a part is played by the visual appearance. Such as, for example, in modern hot-beverage machines, such as coffee machines, tea machines, and so on, wherein the water tank is formed as a visible design element made in general from transparent or translucent material.

It is an object of the invention, therefore, with as far as possible little adverse effect on the overall appearance of such hot-beverage makers, to prevent deposits, including on their visible, water-transporting and/or water-storing components.

This object is achieved through the features of having a water filter cartridge with a housing and a filter-side tank connection element for insertion into a water tank, more particularly into a water tank of a household appliance, and a filter section for treating the water to be taken from the water tank, characterized in that the water filter cartridge comprises a reservoir chamber with a means to counter precipitations in the water tank, where the reservoir chamber is designed separate from the filter section and its flow guideway for the water running through the filter section to be treated, in such a way that there is no contact between the water flowing through the filter section and the means to counter precipitations, and in that the reservoir chamber has at least one passage for the means, whereby the means to counter precipitations is in contact with the unfiltered water in the water tank and/or utilizing a weakly basic anion exchanger material, preferably with polyphosphate ions as counterions, as stabilizing agent. Additional advantageous and expedient developments include having the reservoir chamber arranged in and/or on the housing of the water filter cartridge and/or having the reservoir chamber for a composition to counter precipitations mounted in a lid of the housing of the water filter cartridge and/or having a wall of the reservoir chamber formed at least partly as a perforated wall or sieve and/or utilizing a means to counter precipitations that is a composition that counters limescale precipitations and/or having a further composition to counter limescale precipitations and/or having at least one composition to counter limescale precipitations being a hardness stabilizer and/or where at least one of the compositions to counter limescale precipitations is a sparingly soluble polyphosphate, based more particularly on calcium and/or where at least one of the compositions to counter limescale precipitations is a readily soluble polyphosphate based on sodium and/or where at least one of the compositions there is a stabilizing agent for the polyphosphate and/or where there is a basic anion exchanger material, more particularly with polyphosphate ions as counterions, as stabilizing agent and/or where there is a weakly basic anion exchanger material, preferably with polyphosphate ions as a counterions, as stabilizing agent and/or where there is formed with a filter-side connection element for connection to a complementary, tank-side connection element, formed as a suction port, of a water tank and/or the use of a water filter cartridge having counterions for reducing precipitations in a water tank of a household appliance.

The invention relates accordingly to a water filter cartridge comprising a housing and a filter-side tank connection element for insertion into a water tank, more particularly into a water tank of a household appliance, and a filter section for treating the water to be taken from the water tank. It is distinguished by the fact that the water filter cartridge comprises a reservoir chamber with a means to counter precipitations in the water tank, where the reservoir chamber is designed separate from the filter section and its flow guideway for the water running through the filter section to be treated, in such a way that there is no contact between the water flowing through the filter section and the means to counter precipitations, and that the reservoir chamber has at least one passage for the means, whereby the means to counter precipitations is in contact with the unfiltered water in the water tank.

It is possible accordingly to act to counter limescale precipitations in the water stocked in the water tank even while it is being stored in the water tank, with the result that areas which come into contact with the stocked water remain free and/or can be freed from limescale deposits.

Hence, particularly in the case of water tanks manufactured from transparent materials, their originally clean overall appearance, including the inner walls that are visible from the outside, is retained, even after prolonged service with repeated replenishment of water.

With further advantage, this means to counter limescale precipitations may also support the actual treatment of the water prior to its removal from the tank. This it does by virtue of the processing, upstream of the filter section, of the water stocked in the tank.

In one preferred embodiment, the reservoir chamber may be arranged in and/or on the housing of the water filter cartridge. In the form, for example, of a chamber in the housing. Thus, for example, the reservoir chamber for the means to counter precipitations may be mounted in a lid of the housing of the water filter cartridge. Accordingly the water filter cartridge can be formed with substantially no change in its appearance relative to existing embodiments.

Also possible, however, would be a striking design of the depot in the form of the reservoir chamber. In this way it is possible to counteract instances of confusion with water filter cartridges lacking such a depot. Furthermore, since volume and the shape can be configured largely independently of the constructional requirements of the water filter cartridge.

On the basis of contact openings which can connect the depot or the reservoir chamber with water stocked in the water tank, it is possible to provide access by the water to the means to counter precipitations in the water tank and thereby to bring about processing of this water.

Such contact openings may comprise, for example, holes in the housing, a mesh, a woven or nonwoven fabric, a sieve, a lattice or the like.

According to one preferred version, the means to counter precipitations may be a means to counter limescale precipitations. It is thereby possible, for example, to take action quite deliberately only against limescale deposits.

In a further-preferred version, there may be a further means to counter limescale precipitations. For example, a means of a kind that already disrupts and as far as possible prevents entirely the formation of crystal seeds. And/or a means that keeps the lime fractions in solution in the water.

For example, the means to counter limescale precipitations in the water tank may in one version be first retained in the depot with a mesh, a woven fabric, a sieve, a lattice or the like. This makes it possible to provide a comparatively large contact area between water and the anti-limescale means. And/or else, for example, to ensure that the means cannot escape uncontrolledly.

According to one particularly preferred version, it is possible for this purpose for—for example—a wall of the reservoir chamber to be formed at least partly as a perforated wall or sieve.

Additionally it is possible for openings to be formed in the housing of the water filter cartridge and/or in a housing of the depot, preferably with a larger effective cross section than in the case of mesh, woven fabric, sieve, lattice or the like, in order to minimize the flow resistance and/or diffusion resistance for the water and the means to counter limescale deposition. Accordingly, the means to counter limescale deposition is able to extend its effect to include the water stocked outside the depot, in the water tank. By means, for example, of a concentration gradient.

Since the water stocked in the water tank is generally stored therein for a relatively long time before being taken for consumption and replaced by fresh water, a comparatively slowly progressing effect of water processing is sufficient.

On the other hand, the formation of limescale deposits also requires a corresponding contact time between the water and the surface in question, and so, while a relatively long storage time does promote the formation of limescale deposits, it is nevertheless the case that the means to counter limescale deposits is able, with increasing storage time, to intensify its effect in the water and so to counteract limescale deposits all the more effectively.

In accordance with one version, therefore, the reservoir chamber may be arranged in the housing of the filter cartridge.

According to one preferred embodiment, at least one of the means to counter precipitations, especially to counter limescale precipitations, in the water tank may comprise a weakly acidic cation exchanger. This makes it possible to act on the hardness of the water in the water tank.

According to a further-preferred embodiment, at least one of the means to counter precipitations, especially to counter limescale precipitations, in the water tank may comprise a hardness stabilizer. This allows disruptive action to be taken on seed formation and hence on the precipitation process.

Advantageously, at least one of the means to counter limescale precipitations in the water tank may comprise a sparingly soluble polyphosphate. More particularly, a sparingly soluble polyphosphate based on calcium. This enables a slow reaction time and hence makes it possible to prevent excessive dosing or concentration of polyphosphate in the stocked water.

Alternatively or additionally, at least one of the means to counter precipitations, especially to counter limescale precipitations, in the water tank may comprise a basic, more particularly weakly basic, anion exchanger material, preferably with polyphosphate ions as counterions. The advantage of this over a strongly basic anion exchanger material is that of a higher capacity. This means that the material can be given a greater loading by comparison. Or that, for the same loading, correspondingly less anion exchanger material and hence less storage volume are required. This in turn facilitates the accommodation. In other words, less space is needed.

In particular, the basic and/or weakly basic anion exchanger material may be provided as a stabilizing agent for the polyphosphate. This enables a significant improvement in the shelf life of the means to counter limescale precipitations in the water tank. Even to an extent that it can be stored stably together with a cation exchanger in the water filter cartridge without the occurrence, for example, of efflorescences and free water on the surface of the polyphosphate, which becomes distributed in a film pack and then leaves white marks behind on the product.

According to a further embodiment, at least one of the means to counter precipitations, especially to counter limescale precipitations, in the water tank may comprise a readily soluble polyphosphate based on sodium.

In summary it can be stated that conventional filter cartridges are ineffective against the limescaling of water tanks, because the stocked water is not treated until it is in the interior of the filter cartridge, as it flows through the filter bed arranged therein, with the water not being drawn under suction from the water tank through the filter into the machine until immediately prior to use, namely for the purpose of provision for the hot beverage that is to be prepared.

For this purpose, the water filter cartridge, for installation into a water tank of a household appliance, is filled at least partly with first softening and/or decarbonizing granules, with the water being drawn from the water tank preferably via suction means through the filter cartridge and the granules.

The raw water stocked in the water tank upstream of the water filter cartridge, however, remains unaffected by this processing.

The proposal made is therefore to equip such a water filter cartridge additionally with a hardness stabilizing agent and/or reducing agent for water hardness, for preventing limescale precipitation in the interior of the water tank, so that the water stocked in the water tank upstream of the water filter cartridge is able to come into contact therewith.

For this purpose, in the lid and/or else on its outside, for example, the filter cartridge may comprise an additional container, which contains the agent for protection against precipitations, especially against limescale precipitations, and which has at least one contact point and/or contact opening between the means to counter precipitations, more particularly to counter limescale precipitations, and tank water.

Additionally, on the water filter cartridge, an additional ring or the like may be provided with ion exchanger agent or hardness stabilizing agent. For example, filled with sparingly soluble polyphosphate.

With preference a chamber is formed to accommodate a stabilizing agent in a lid of the water filter cartridge. By this means there is no additional space requirement necessary for accommodating the stabilizing agent.

Employed in accordance with the invention as a means to counter precipitations, more particularly to counter limescale precipitations, is a basic anion exchanger having a fraction of counterions in polyphosphate form.

Polyphosphates are typically metered into a raw water for the purpose of hardness stabilization. For this purpose, one possibility is that of liquid metering with readily soluble polyphosphates, or a solubility-controlled metering via the contact with sparingly soluble polyphosphates.

In the case of readily soluble polyphosphates, those predominantly involved may be sodium salts of the polyphosphates, while correspondingly, in the case of the sparingly soluble polyphosphates, the salts involved may predominantly be calcium or magnesium salts of the polyphosphates.

A problem to date with metering into the water tank has been that the sparingly soluble salt does not sufficiently deliver polyphosphate for protection from limescaling. Moreover, the sparingly soluble polyphosphate cannot be stored together with a tank filter, since the weakly acidic ion exchanger generates an ambient moisture level of more than 80% relative atmospheric humidity in an airtight film pack. Sparingly soluble polyphosphate, however, cannot be stored stably at a relative atmospheric moisture content of greater than 50%. The consequences of the joint packaging of sparingly soluble polyphosphate and moist ion exchanger are therefore efflorescences and free water on the surface of the polyphosphate, which becomes distributed in a film pack and then leaves white marks behind on the product.

The use of the liquid polyphosphate is likewise difficult, since the metering process in the application must last for more than 3 months, without overdosing. While it is possible to adjust delivery to a certain degree via a low contact area and diffusion, the problem of storage (leakage—drying up) and also of overdosing on long contact is almost impossible to solve.

For production, then, the initially liquid polyphosphate is bound ionically to a preferably weakly basic anion exchanger. The reason is that weakly basic anion exchangers have a substantially higher loading capacity than their comparatively strongly basic counterparts. Accordingly, the same loading capacity can be provided with, by comparison, a much smaller amount of anion exchanger than with a strongly basic anion exchanger. Correspondingly, there is also a reduction in the space requirement and/or required volume needed for this purpose.

The exchanger thus treated can be stored almost infinitely in both dry and wet forms. Additionally, the delivery of polyphosphate in contact with water is limited at the upper end by ion exchange equilibrium reactions with the water constituents. Below the equilibrium with the raw water, however, the delivery rate is high, and so sufficient polyphosphate can be delivered over a long period.

The formula for delivery in an application, into a water tank, for example, is as follows:

$R^+_N$: weakly basic anion exchanger
$[H_2PO_4]_N$: polyphosphate with chain length N and N negative charges
$HCO_3^-$: hydrogen carbonate The polyphosphate here acts as a seed inhibitor to counter the formation of CaCO3 crystals.

The water filter cartridge can be formed advantageously with a filter-side connection element for connection to a complementary, tank-side connection element, formed as a suction port, of a water tank.

This permits connection of the water filter cartridge to a tank base. For example, for operation in suction mode.

WORKING EXAMPLE

The present invention is elucidated in more detail below with the appended figures and with the description that refers to them.

DETAILED DESCRIPTION OF THE INVENTION INCLUDING BEST MODE

Figure 1:
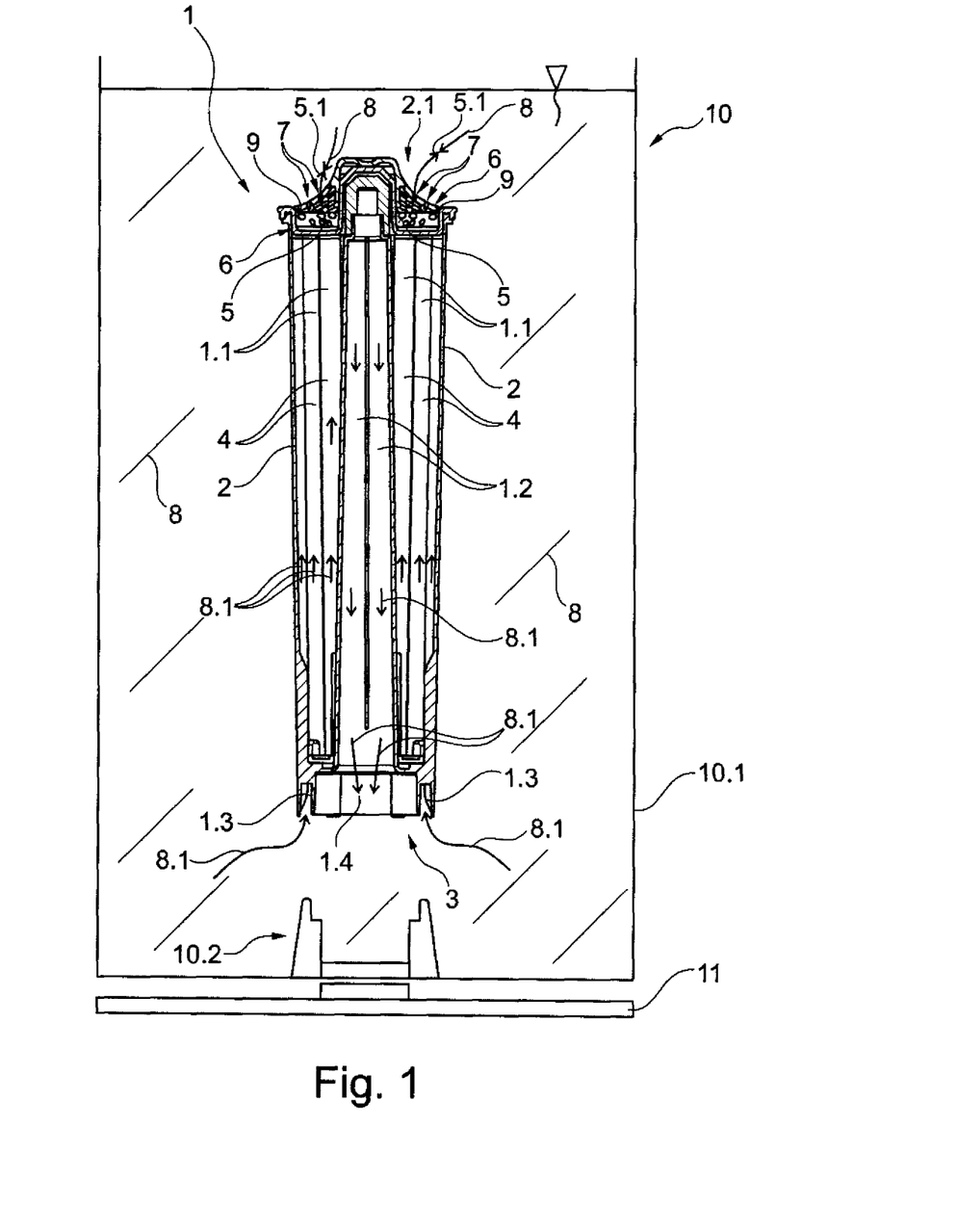
FIG. 1 shows, by way of example and schematically, a water filter cartridge in longitudinal cross section, on insertion into a water tank, which is likewise shown in longitudinal cross section.

FIG. 1 shows a water filter cartridge 1 on insertion into a water tank 10, the housing of which is numbered 10.1. For this purpose, the filter-side tank connection element 3 is joined to a tank-side filter connection element 10.2. Preferably by means of a plug connection.

The water filter cartridge 1 comprises a housing 2, an inlet opening 1.3 and an outlet opening 1.4 for the ingress and egress of the water 8, stocked in the water tank, into the filter cartridge 1 and out again. This water 8 is guided via a filter section 4, for treatment for use in, for example, a hot-beverage machine 11 that is connected downstream. A filter section of this kind may be formed in the inflow chamber 1.1 and/or the outflow chamber 1.2. The arrows 8.1 symbolize the running direction of the water when it is taken from the water tank 10, when the filter cartridge 1 in the ready-inserted state is working in filter operation.

In accordance with the invention, additionally to the filter section 4 and formed separately from it, the water filter cartridge 1 comprises a depot in the form of a reservoir chamber 6 for at least one means 5 to counter precipitations in the water tank, more particularly for at least one means to counter limescale precipitations in the water tank, where contact openings 7 are provided which connect the depot in the form of the reservoir chamber 6 to the water 8 stocked in the water tank 10.

The reservoir chamber 6 may be arranged in the housing 2 of the water filter cartridge 1. In the case depicted, this is realized in a lid 2.1 of the housing 2.

The at least one means 5 to counter precipitations, more particularly to counter limescale precipitations, in the water tank may comprise an acidic cation exchanger, more particularly a weakly acidic cation exchanger, and/or a hardness stabilizer and/or a sparingly soluble polyphosphate, more particularly based on calcium.

The at least one means 5 to counter precipitations, more particularly to counter limescale precipitations, in the water tank may also comprise a readily soluble polyphosphate based on sodium.

Furthermore, the at least one means 5 to counter precipitations, more particularly to counter limescale precipitations, in the water tank may comprise a basic anion exchanger material, preferably with polyphosphate ions as counterions. To provide a higher capacity, a weakly basic anion exchanger material is used, more particularly a weakly basic anion exchanger material with polyphosphate ions as counterions.

And the weakly basic anion exchanger material may be provided as a stabilizing agent for the polyphosphate.

The arrows 8.1 symbolize the inflow of the water 8, stocked in the water tank 10, to the at least one means 5 to counter precipitations, more particularly to counter limescale precipitations, in the water tank. It flows through the contact openings 7 into the depot to the means 5. Optionally there is also a nonwoven fabric 9 or the like in order to additionally enclose the means 5.

The arrows 5.1 symbolize water 8 which is stocked in the water tank 10 and which has already been processed with the at least one means 5 to counter precipitations, more particularly to counter limescale precipitations, in the water tank. Owing to the higher concentration of the processing substances from the at least one means 5 in the water 8 in the vicinity of the at least one means 5, in comparison to water stocked elsewhere in the water tank and having not yet made contact with the at least one means 5, a concentration balancing is triggered, which in the course of the storage time brings about the processing of the rest of the water stored in the water tank, as well, and hence in accordance with the invention results in the avoidance of precipitations, especially limescale precipitations, on the surfaces coming into contact with the water.

Figure 2:
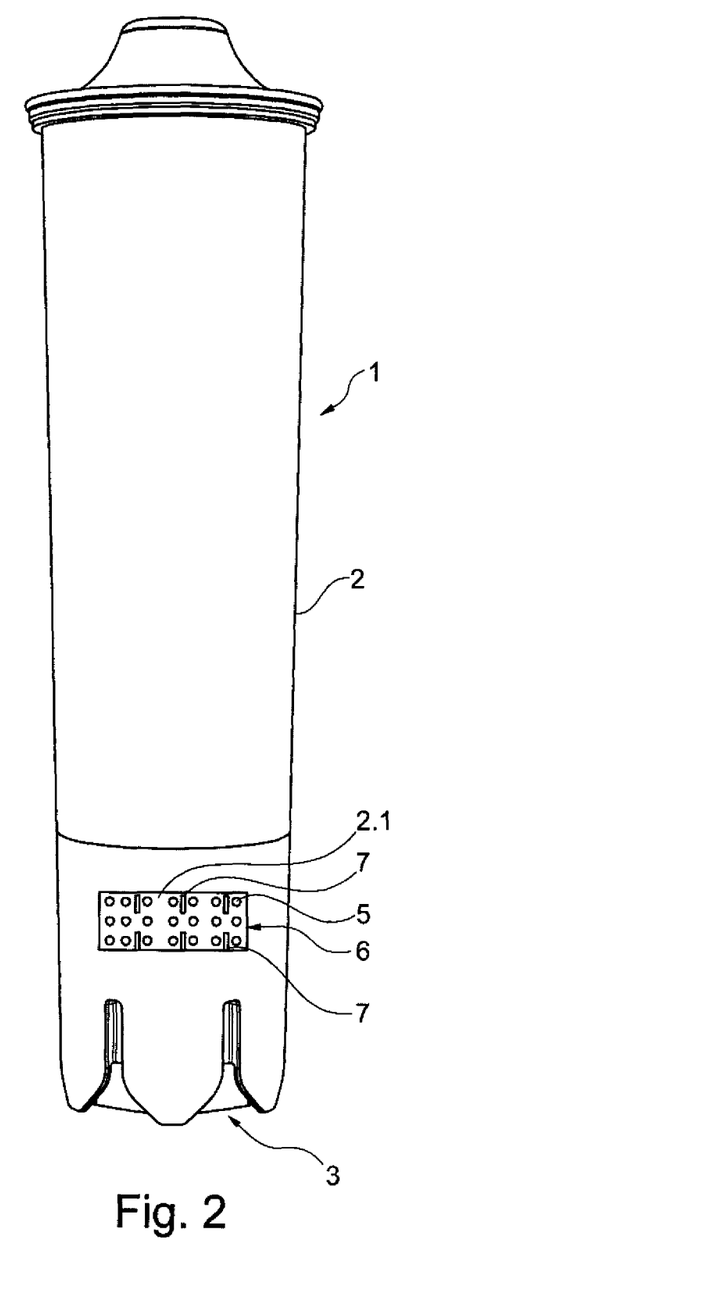
FIG. 2 shows, by way of example and schematically, a detail of an alternative embodiment to FIG. 1 of a water filter cartridge, having a depot for a means to counter limescale precipitations, in front elevation.

FIG. 2 shows, by way of example and schematically, a representation of an alternative embodiment to FIG. 1 of a water filter cartridge 1, having a filter-side tank connection element 3 and a depot in the form of a reservoir chamber 6 for at least one means 5 to counter precipitations, more particularly to counter limescale precipitations, in front elevation. In this case, a depot 6 for the at least one means 5 to counter precipitations, more particularly to counter limescale precipitations, may be arranged in and/or on the housing 2. For visualization of the preferably granular means 5, small circles are shown. The granules 5 may be held in the depot 6 via a cover means 2.1, e.g., corresponding to the lid 2.1 in the version according to FIG. 1.

Here as well, contact openings 7 may permit access for water to the means 5. The rectangular representation of the contact openings 7 is purely by way of example, for better differentiation, in this visualization. The openings may quite easily also have other contours and/or cross sections. This embodiment, with the depot 6 arranged comparatively near to the water inlet and/or to the water outlet, for the at least one means 5 to counter precipitations, more particularly to counter limescale precipitations, may be advantageous, for example, for water tanks whose height is low. In particular, on the basis of the low arrangement relative to the operating position of the water filter cartridge, a maximum contact time of the limescale preventative with the water surrounding the water filter cartridge can be realized.

Figure 3:
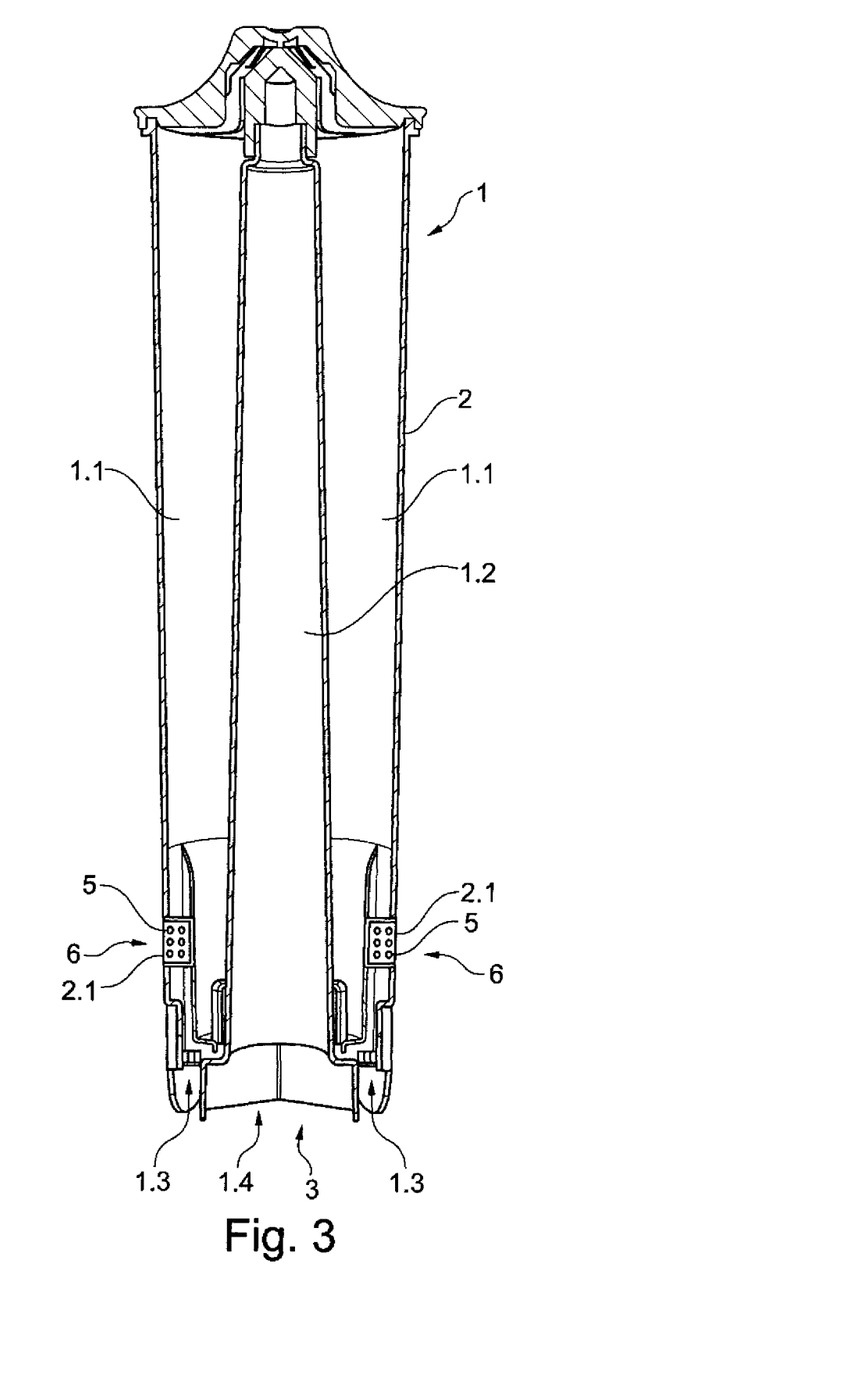
FIG. 3 shows, by way of example and schematically, a sectional representation for the embodiment according to FIG. 2

FIG. 3 shows a sectional representation for the version of a water filter cartridge 1 that is depicted in FIG. 2, with depots 6, arranged on opposite sides of the housing 2, for the at least one means 5 to counter precipitations, more particularly to counter limescale precipitations. Contact openings for access for water to the at least one means 5 are not shown, in order to simplify the representation, but may be present. The rest of the reference numerals correspond to the features of the water filter cartridge 1 as set out in relation to FIG. 1.

LIST OF REFERENCE NUMERALS

1 Water filter cartridge
1.1 Inflow chamber
1.2 Outflow chamber
1.3 Inlet opening
1.4 Outlet opening
2 Housing
2.1 Lid
3 Filter-side tank connection element
4 Filter section
5 Means to counter limescale precipitations
5.1 Water processed with means to counter limescale precipitations
6 Depot
7 Contact openings
8 Water
8.1 Arrow
9 Nonwoven or the like
10 Water tank
10.1 Housing
10.2 Tank-side filter connection element
11 Household appliance, esp. hot-beverage machine

What is claimed is:

1. A water filter cartridge device (1) comprising:
a housing (2) and a filter-side tank connection element (3) for insertion into a water tank (10),
wherein the housing having an inlet, an outlet, an inside section, and outside surface, and a filter section (4) to treat water (8), wherein water taken from the water tank flows through a flow guideway from the inlet to the outlet of the housing, and
a reservoir chamber (6) with a means (5) to counter precipitations in the water tank,
wherein the reservoir is disposed on the outside surface of the housing,
wherein the reservoir has at least one flow passage to the means to counter precipitations in the water tank,
wherein the reservoir has at least one reservoir inlet and at least one reservoir outlet for water to flow from the either the water tank or the outlet of the housing into the at least one flow passage and each reservoir inlet is structurally independent of the inlet and outlet of the housing and each reservoir outlet is structurally independent of the inlet and outlet of the housing;
wherein the water in the flow passage is separate and distinct from the water in the flow guideway.

2. The water filter cartridge device as claimed in claim 1 wherein the reservoir chamber (6) is arranged in a bottom portion of the housing (2) of the water filter cartridge (1).

3. The water filter cartridge device as claimed in claim 1 wherein the reservoir chamber (6) with the means (5) to counter precipitations is mounted in a lid (2.1) of the housing of the water filter cartridge.

4. The water filter cartridge device as claimed in claim 1 wherein the reservoir chamber has a wall and the at least one flow passage is in the wall of the reservoir chamber (6) and is at least a partly perforated wall or sieve.

5. The water filter cartridge device as claimed in claim 1 wherein the means to counter precipitations (5) is a counter limescale precipitation agent.

6. The water filter cartridge device as claimed in claim 1 further comprising a second means (5) to counter precipitations.

7. The water filter cartridge device as claimed in claim 1 wherein the means (5) to counter precipitations includes a hardness stabilizer.

8. The water filter cartridge device as claimed in in claim 1 wherein the means (5) to counter precipitations is a soluble polyphosphate.

9. The water filter cartridge device as claimed in claim 1 wherein the means (5) to counter precipitations is a soluble sodium polyphosphate.

10. The water filter cartridge device as claimed in claim 8 further comprising a stabilizing agent for the soluable polyphosphate.

11. The water filter cartridge device as claimed in claim 10 wherein the stabilizing agent is a basic anion exchanger material with polyphosphate ions as counterions.

12. The water filter cartridge device as claimed in claim 10 wherein the stabilizing agent is a weakly basic anion exchanger with polyphosphate ions as counterions.

13. The water filter cartridge device as claimed in claim 1 wherein the filter-side connection element is for connection to a suction port of a water tank.

14. A water filter cartridge device comprising:
(a) a water filter housing having an inside surface, an outside surface, an inlet, an outlet and a filter disposed between the inlet and the outlet and an internal flow guideway from the inlet through the filter and out the outlet; and
(b) a receptacle containing a means to counter precipitates disposed on the outside surface of the water filter housing and isolated from the inside surface of the water filter housing,
wherein said receptacle having at least one opening to communicate with a fluid surrounding the outside surface of the water filter housing to provide an external flow path between the outside surface of the water filter housing and the fluid surrounding the water filter housing,
wherein the receptacle has at least one receptacle inlet and at least one receptacle outlet for water to flow from the either the outside surface of the water filter housing or the outlet of the water filter housing into the external flow path and each receptacle inlet is structurally independent of the inlet and outlet of the water filter housing and each receptacle outlet is structurally independent of the inlet and outlet of the water filter housing;
wherein the water filter housing and receptacle provide separate and different treatments for water so that a failure or depletion of one does not result in a failure or depletion of the other.

15. The water filter cartridge device of claim 14 wherein the receptacle is connected to the water filter housing near the outlet.

16. The water filter cartridge device as claimed in claim 14 further comprising a tank or reservoir wherein the means to counter precipitates is mounted in a lid in the water filter housing.

17. The water filter cartridge device as claimed in claim 14 wherein the chemical composition to prevent precipitation deposits is a soluble polyphosphate.

18. A water filter cartridge device comprising:
(a) a water filter housing having an interior surface, an exterior surface, a water inlet, a water outlet and a first water treatment chamber disposed between the water inlet and the water outlet,
wherein untreated and/or partially pretreated water from a tank or water reservoir travels through a flow guideway from the water inlet through the first water treatment chamber and out the water outlet and out of the tank or water reservoir; and
(b) a combined water inlet and outlet and a second water treatment chamber disposed on the exterior surface of the water filter housing and isolated from the first water treatment chamber inside the water filter housing,
wherein said second water treatment chamber contains a chemical composition to prevent precipitation deposits in the tank or in the water in the tank or water reservoir
wherein water from the tank or water reservoir containing untreated and/or partially pretreated water travels from the combined water inlet and outlet through a flow path to the second water treatment chamber and then out the combined water inlet and outlet into the tank or water reservoir containing untreated and/or partially pretreated water before the water enters the water inlet of the filter housing,
wherein the flow guideway is structurally separate and distinct from the flow path.

19. The water filter cartridge device of claim 18 wherein the combined water inlet and outlet of the second water treatment chamber is a separate water inlet and a separate water outlet.

20. A water filter cartridge device (1) comprising:
a housing (2) and a filter-side tank connection element (3) for insertion into a water tank (10),
wherein the housing has an inlet, an outlet, an inside section, and outside surface, and a filter section (4) to treat water (8), wherein water taken from the water tank flows through a flow guideway from the inlet to the outlet of the housing, and
a reservoir chamber (6) with a means (5) to counter precipitations in the water tank,
wherein the reservoir chamber is disposed on the outside surface of the housing,
wherein the reservoir chamber has at least one flow passage to the means to counter precipitations in the water tank,
wherein the reservoir chamber has at least one reservoir inlet and at least one reservoir outlet for water to flow into and out of the at least one flow passage and each reservoir inlet is structurally independent of the inlet and outlet of the housing and each reservoir outlet is structurally independent of the inlet and outlet of the housing;
wherein the water in the flow passage is separate and distinct from the water in the flow guideway.

21. A water filter cartridge device comprising:
(a) a water filter housing having an inside surface, an outside surface, an inlet, an outlet and a filter disposed between the inlet and the outlet and an internal flow guideway from the inlet through the filter and out the outlet; and (b) a receptacle containing a means to counter precipitates disposed on the outside surface of the water filter housing and isolated from the inside surface of the water filter housing, wherein said receptacle having at least one opening to communicate with a fluid surrounding the outside surface of the water filter housing to provide an external flow path between the outside surface of the water filter housing and the fluid surrounding the water filter housing, wherein the receptacle has at least one receptacle inlet and at least one receptacle outlet for water to flow from the outside surface of the water filter housing into the external flow path and each receptacle inlet is structurally independent of the inlet and outlet of the water filter housing and each receptacle outlet is structurally independent of the inlet and outlet of the water filter housing;

wherein the water filter housing and receptacle provide separate and different treatments for water so that a failure or depletion of one does not result in a failure or depletion of the other.

\* \* \* \* \*